May 24, 1966   E. A. GRISWOLD   3,252,885
ELECTROSTATIC FILTER FOR CLEANING DIELECTRIC FLUIDS
Filed April 26, 1962   2 Sheets-Sheet 2
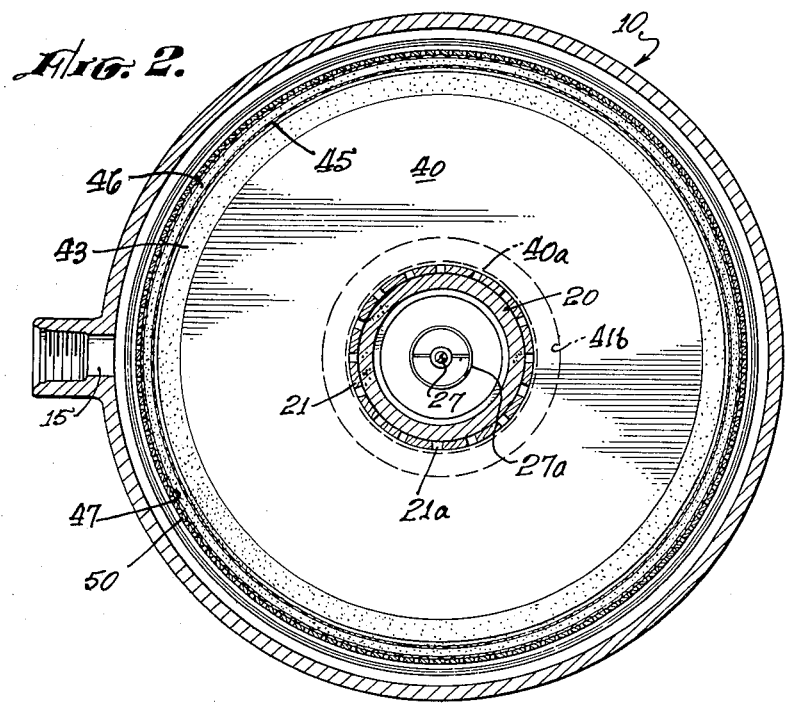
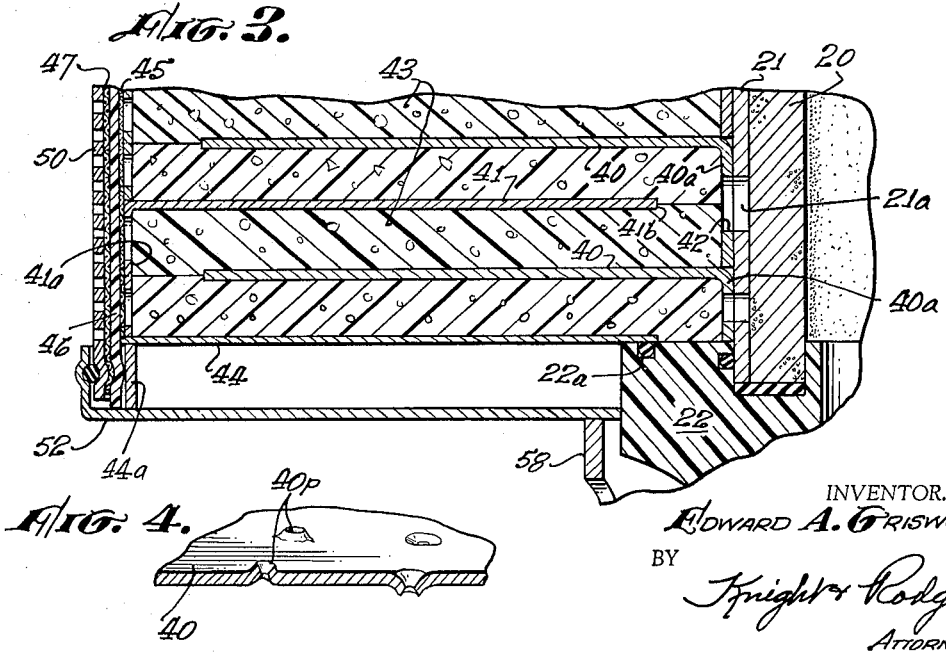
INVENTOR.
EDWARD A. GRISWOLD,
BY
Knight & Rodgers
ATTORNEYS.

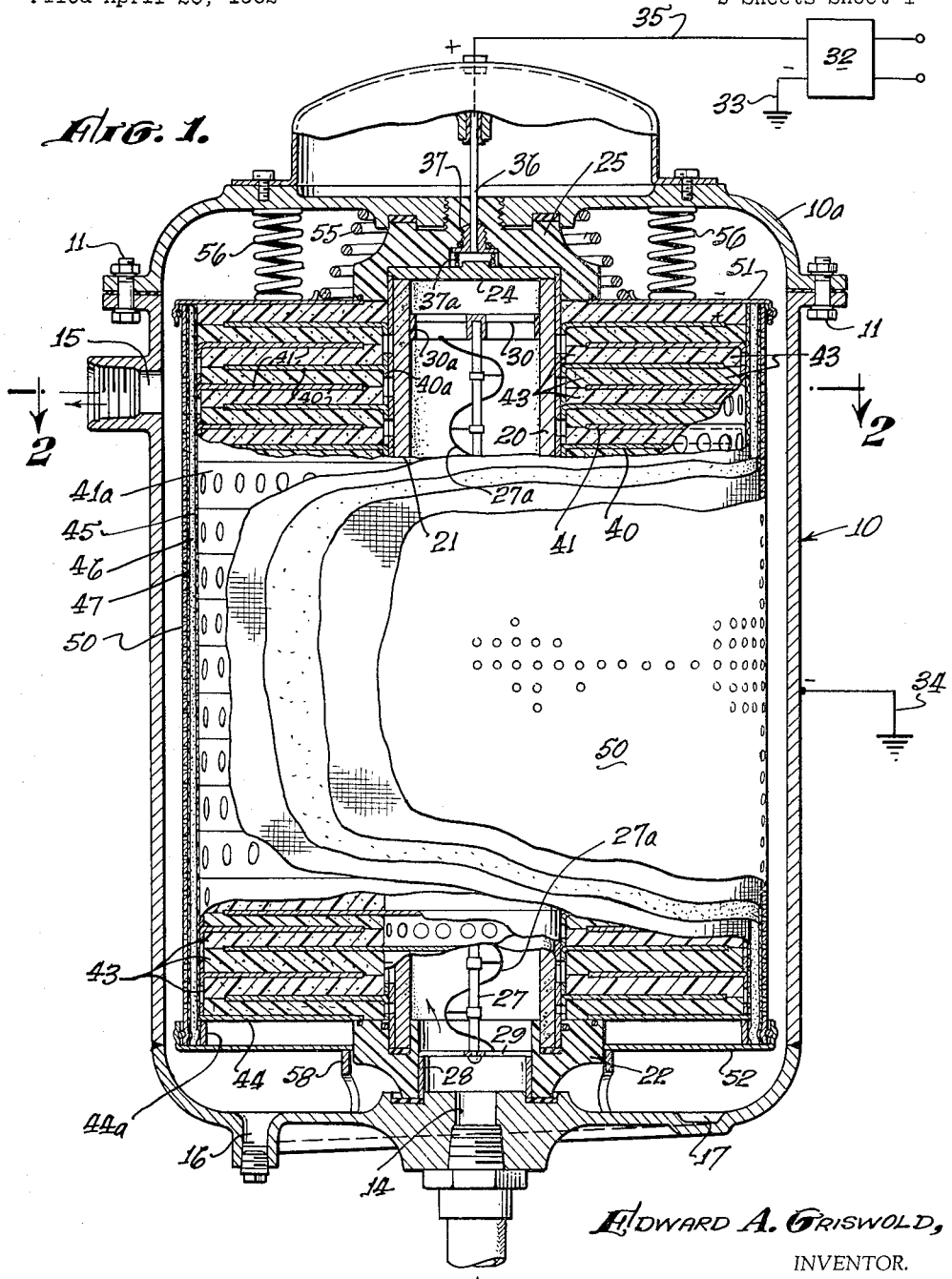

United States Patent Office 3,252,885
Patented May 24, 1966

3,252,885
ELECTROSTATIC FILTER FOR CLEANING
DIELECTRIC FLUIDS
Edward A. Griswold, 1145 Steuben St., Pasadena, Calif.
Filed Apr. 26, 1962, Ser. No. 190,457
20 Claims. (Cl. 204—302)

The present invention relates generally to a fluid filter; and more especially to a combination filter for fluids using both mechanical filters and electrostatic fields to insure removal of all foreign particles suspended in the fluid being cleaned.

The problem of removing very fine particles from a body of fluid is not readily solved by a mechanical filter alone since it becomes necessary to use a filter element having such very fine pores or openings to pass the fluid that they are easily clogged by removed particles lodging in the pores. The resistance to fluid flow increases rapidly as pores become clogged; and resistance to fluid flow may be intolerably great even without such clogging when the openings are small enough to retain particles of micron size.

It is known, especially in treating dirty gases, that suspended particles can be charged electrically and then caused to migrate to and be deposited on a collecting surface under the influence of an electric field. An electric filter of this type if often not suitable for cleaning a liquid because the resistance to particle movement within a body of liquid is so great that the liquid must remain in the field for a long time. At the same time the electric field does not impose any restriction on flow of liquid through a filter.

In some situations, for example fuels for missiles, there is a demand for a liquid of greatest possible freedom from contaminants, either solid or liquid, and the liquid to be cleaned has a high dielectric value. This is true in general of liquid hydrocarbons substantially free from water, and it is a characteristics that makes possible the use of an electrostatic field as a filter means for such a liquid.

Hence it is a general object of the present invention to provide a filter for liquids able to remove very fine suspended particles and produce a liquid of high purity.

It is also an object of the invention to provide a filter of novel design that combines desirable features of both mechanical and electro-filters.

A further object is to provide a filter of novel design that combines advantageously both mechanical filter elements and an electro-filter and is adapted to cleaning liquid hydrocarbons or other liquids having a high dielectric value.

A still further object of the invention is to provide a liquid filter of novel design that is flexible in operation, economical to manufacture and simple to maintain in efficient operating condition.

Another object of the invention is to provide a filter of this general type that is adapted to remove from a body of liquid both solid or liquid particles suspended therein, the latter by breaking up emulsions if necessary.

These objects are attained in a filter embodying the present invention by providing a hollow shell having fluid inlet and outlet openings; a first filter means comprising a mechanical or porous-element type filter through which the liquid first passes; a second filter means downstream from the first and including a pair of non-discharging electrodes spaced apart to permit fluid flow between them; and means for establishing an electric potential between the electrodes to maintain between the two electrodes an electrostatic field. In a preferred form there is a third filter means comprising a mechanical or porous-element type of filter downstream from the second filter means, as with this arrangement higher efficiency is assured as well as making possible fluid flow in either direction through the filters.

How the above objects and advantages of the invention are achieved will be better understood by reference to the following description and to the annexed drawing, in which:

FIG. 1 is a combined partial elevation and longitudinal median section with successive portions of the interior structure of the filter broken away.

FIG. 2 is a transverse section through the filter on line 2—2 of FIG. 1.

FIG. 3 is an enlarged fragmentary median section, as in FIG. 1, of a portion of the filter assembly.

FIG. 4 is a fragmentary perspective of a variational form of plate electrode.

Referring now to the drawing, it will be seen that the liquid filter of the present invention includes a tubular shell indicated generally at 10. This shell is usually circular in cross section and conforms to the general design considerations of a pressure vessel since ordinarily the shell is subjected to fluids under pressures that may run as high as several hundred pounds per square inch. One end of the shell is provided with a removable head section 10a attached to the remainder of the shell by bolts 11 or any other suitable means. When head 10a is removed, access is had to the interior filter element which may be removed as a unit for cleaning, replacement or any necessary maintenance.

Shell 10 is provided with two spaced openings 14 and 15 which may be connected to liquid conduits in any suitable manner. The spaced openings 14 and 15 provide inlet and outlet openings for liquid passing through the filter to be cleaned. Since flow through the filter may be in either direction either one of these openings may be the liquid inlet and the other the liquid outlet.

Because there is often a tendency for a certain amount of sludge or foreign material to collect within the shell, especially when the liquid to be filtered enters through opening 15 it is preferable to provide the shell with a drain as indicated at 16 and an annular gutter 17 or similar means for conducting sediment to the drain opening. Obviously, the drain is preferably located at the lowest point in the shell.

In the preferred embodiment of the invention illustrated in FIG. 1, the shell 10 is illustrated with its longitudinal axis extending vertically and with the fluid inlet assumed to be at opening 14. Accordingly opening 15 is then the outlet. However, this specific arrangement is not limitative upon the invention and it will be understood that the filter may be arranged with this longitudinal axis horizontally extending or inclined, as may be desired under circumstances at an installation. This is equally feasible since flow through the filter is created by a differential pressure between the inlet and outlet openings and is not dependent upon gravity, convection current or the like.

The first filter element encountered by the liquid as it flows from inlet 14 to outlet 15 is a hollow cylindrical filter element 20 located centrally of and extending axially of shell 10. Filter element 20 is a mechanical or porous-element type of filter and may comprise a cylindrical body of a finely porous material such as sintered metal, ceramic, or any other suitable material providing openings of suitably small size. Cylindrical filter element 20 is open at the lower end to receive fluid entering the shell through inlet 14 and is closed at the upper end, thus forcing the liquid to flow radially outward of the filter element through the cylindrical walls thereof. In the event filter element 20 is mechanically weak, it is supported externally by a perforated cylinder 21 which not only radially supports the filter element against the internal liquid pressure but also serves as a structural core member for supporting other filter elements, as will be described. Cylinder 21 is metal to be electrically conductive.

Cylindrical core 20 rests at its lower end on an annular seat in block 22 which is made of any suitable dielectric material in order to insulate the core from the shell. Block 22 is in turn supported centrally of the shell by resting upon the bottom wall thereof. The upper end of core 21 is closed either by an integrally formed end wall or by a separate metal plate 24 which rests upon the upper end of the cylindrical core and is imperforate. On top of plate 24 is insulator block 25 of a suitable solid dielectric material which bears against the inner face of head section 10a of the shell. In this way when the head section is bolted in place and tightened, cylindrical core 20 and sleeve member 21 are held firmly between end blocks 22 and 25; and these members serve as a central supporting column for elements of the filter described later.

Coaxial with filter element 20 and perforated cylinder 21, is the central electrode 27 which is supported at its lower end by collar 28 located within a central bore through the lower dielectric block 22 and provided with a supporting spider 29 to which the lower end of electrode 27 is fastened. The upper end of electrode 27 is positioned centrally with respect to cylinder 21 by spider 30 which is of dielectric material. Spider 30 preferably has a peripheral flange 30a which bears against the inside surface of filter element 20. Electrode 27 may take any one of several known designs that promote the corona discharge at the electrode. A fine wire 27a wound in a spiral around a central supporting rod is illustrated as a typical electrode design. The radius of the spiral is such as to produce the proper electrical clearance between the discharge electrode wire 27a and the opposing electrode comprising sleeve 21 and/or core 20.

Electrode 27 and cylinder 21 are both metal and constitute a pair of opposing electrodes between which is maintained an ionizing or charging field. For this purpose electrode 27 is a discharge electrode and electrode 21 is a non-discharging electrode. If filter 20 is made of sintered metal, it is also conductive and is a part of the non-discharging electrode assembly.

As is well known in the art of electrical precipitation of suspended particles, particularly from gaseous streams, a discharge electrode is one which has a configuration that provides points, corners, edges, or other surfaces of relatively small radius which concentrate the electrostatic field to form localized high-stress zones and so facilitate the production of corona discharge thereat in a gaseous fluid although corona discharge is not produced in a dielectric liquid. On the other hand a non-discharging electrode is one which has flat or extended areas free from portions of having a relatively sharp radius and therefore produce a relatively uniform electro-static field, or which otherwise suppress the tendency to produce corona discharge.

In order to establish high voltage electro-static field between electrodes 21 and 27, there is provided any suitable type of electrical equipment indicated generally at 32. It may be external to the filter or may be mounted on the filter shell. Such equipment is well known in the art and need not be described in detail here since it constitutes no part of the present invention; but in general such equipment includes a suitable step-up transformer and rectifying means adapted to produce an output of relatively high potential. For this purpose voltage in the range of 10,000 to 14,000 volts are normally sufficient although it will be obvious that the exact voltage used may be varied by the designer to suit the liquid being treated, the inter-electrode spacing, and other factors. One output terminal of the power source 32 is grounded as indicated at 33 while shell 10 is also grounded as indicated at 34. The other output terminal of power source 32 is connected by insulated high tension conductor 35 to a centrally located lead-in 36 which passes through dielectric block 25 and is connected through plug 37 and spring 37a to plate 24 which, being metal, is a conductor and is electrically connected to electrode 21 by contact therewith. It is also connected by contact to filter 20 to energize the latter if conductive. Electrode 21 is insulated from the shell by dielectric blocks 22 and 25 at the two ends of the central core. On the other hand discharge electrode 27 is grounded to the shell through metallic collar 28 and spider 29.

A second filter element inside the shell is located downstream from the first filter element and comprises a plurality of pairs of electrodes of the non-discharging type. These electrodes are provided by pairs of spaced plates 40 and 41 which surround the cylindrical core 21 and extend radially outwardly therefrom. The plates 40 have centrally located flanges 40a having an internal diameter such that they slide easily over but contact the exterior of core 21, as may be seen particularly in FIG. 3. Flanges 40a are perforated as indicated at 42, the perforations being large enough and numerous enough that some of them always align at least in part with the openings 21a in core cylinder 21 in order to allow liquid to flow radially outwardly through filter element 20 then through the surrounding core and the flanges 40a.

As may be seen particularly in FIG. 3, flanges 40a permit the disc electrodes 40 to be stacked on top of each other in contact with and supported by cylindrical core 21 through which electrodes 40 are energized. The flat surfaces of plates 40 are substantially parallel to each other and radial with respect to the filter axis.

Midway between each two plates 40 is a plate or disc 41, plate 40 and plate 41 constituting a pair of oppositely charged electrodes, as will be further explained. Each plate 41 has a peripheral flange 41a which engages the inside face of metallic cylinder 45. Cylinder 45 is here shown as a fine mesh screen; but it will be realized that a perforated sheet metal wall may also be used at this point in place of the screen.

The peripheral flange of the lowermost plate electrode 41 rests upon plate 44 which is supported centrally upon dielectric block 22 and is supported at its periphery by ring 44a which is in turn supported by bottom plate 52. A fluid tight seal is preferably effected by an O-ring 22a or other means between plate 44 and center block 22 in order to prevent liquid from by-passing the filters. Electrodes 41 above the lowermost one each have their flanges resting upon the plate electrode next below so that each plate electrode, except the top one, supports a plate above it by engagement at the periphery with the superimposed flange. Thus plates 41 are arranged in a stack supported on one another and confined laterally by the surrounding foraminous cylinder 45. Each plate 41 has a central opening 41b larger than the outside diameter of plate flanges 40a, in order to provide adequate electrical clearance between each flange and the surrounding plate 41 at this point. In the same way the diameter of plates 40 is less than the diameter of the surrounding flanges 41a by a distance sufficient to give adequate electrical clearance between these plates and the flanges.

While it is of course possible to support plate electrodes 40 in any other suitable fashion, it is convenient to support them upon the cylindrical core 21 because the contact thus afforded between the plate flanges and the core, in addition to giving physical support to the plates, effects an electrical connection between the plate electrodes and the core itself. Thus plates 40 are maintained at a relatively elevated potential while plates 41 are grounded through other parts of the supporting structure since they are electrically connected to shell 10.

Between each pair of plates 40 and 41 is a body 43 of a porous dielectric material. Suitable for this purpose is a polyurethane foam of the open cell type. Each body 43 of porous dielectric material serves several purposes. It not only helps support the plate electrodes to maintain the proper spacing between them but also acts as a diffuser which slows down the rate of liquid flow between two parallel plate electrodes. This gives a longer time for the electrostatic field maintained between a pair of plates to exert an influence on the suspended particles and gives them an opportunity to migrate to one of the plate electrodes. In addition, a third function of the porous dielectric material is to serve as a filter. A certain amount of filter action is a natural consequence of the passage of the liquid through the body of porous dielectric material; but for reasons that will be further apparent the mechanical filtering action is more or less incidental.

A third filter element is provided downstream from the second filter means provided by the parallel plate electrodes. This third filter element comprises a sheet 46 of a suitable porous material around the screen cylinder 45. This filter element 46 is likewise cylindrical in configuration and is in contact with the outer surface of cylinder 45. Outwardly of the filter element 46, there is preferably placed a wire mesh screen 47 in contact with the filter element 46. This cylindrical screen 47 is a relatively coarse screen, considering the size of the particles involved, and is designed to retain only particles of a diameter of 50 microns or larger. Thus it passes anything under about 50 micron size. This size of particle is chosen arbitrarily for illustrative purposes and it will be realized that the mesh size of the screen may be selected to pass larger or smaller particles.

Outside of the screen 47 is an outer cylinder 50 designed as a structural member to retain the inner elements in place and support them physically against the interior pressures against them developed by the liquid moving through the filter elements.

Outer cylinder 50 is connected to and carries top and bottom plates 51 and 52 respectively which have axially turned rims by which the plates are connected to the cylinder in any suitable manner. In this way all the filter elements are maintained together in the proper relative positions as a unitary assembly which can be inserted into shell 10 or removed therefrom as a unit when the head section 10a is unbolted and removed.

As a means of obtaining axial pressure on the assembly of plates and filter elements to prevent relative movement, and also as a means of providing an electrical connection between the shell and certain of the filter elements, springs 55 and 56 are interposed between the top plate 51 of the assembly and the inside face of end section 10a of the shell. These springs provide a yielding force on the filter assembly pushing it against support ring 58 at the base. Ring 58 supports the filter assembly at a position adjacent lower insulator block 22.

Construction of a preferred embodiment of my filter having been described, the operation of it will now be described briefly. The stream of liquid from which suspended particles are to be removed is introduced in the shell 10 at inlet opening 14. The fluid stream enters directly the interior space of the cylindrical filter element 20 in which space the fluid stream is subjected to the particle charging-action of the high intensity charging field maintained between wire electrode 27 and non-discharging cylindrical electrode 21. In this field, the suspended particles become electrically charged as they flow through the space within the cylinder and then outwardly through filter element 20.

Filter element 20 is designed to be a relatively coarse filter for the purpose of removing the larger particles in suspension. While the dividing line between the small and large particles is in any case arbitrary, in a typical installation filter 20 has such small openings that the filter retains substantially all particles that are approximately 50 microns in diameter or larger. Particles which are smaller are considered to be the fine fraction which is removed by the second filter means.

The liquid stream flows outwardly of cylinder 21 through the openings 21a therein and the openings 42 in the flanges of plates 40. The fluid stream can now flow in a radial direction parallel to and between the surfaces of the electrode pairs 40 and 41. In this space the liquid stream is subject to the action of the non-discharging electro-static field maintained between two successive plate electrodes. This electric field is substantially uniform because the electrodes are parallel and it causes the charged particles to migrate to one of the electrodes. The electrode on which they collect will be the one of opposite polarity to the discharge electrode 27 which, in the arrangement illustrated is electrode system comprised of plates 40. For this purpose, electrode 27 may be either positive or negative as desired.

Any relatively coarse particles that pass through the first filter means into the field of action of the second filter means, such particles may well be retained by the filter action of the porous dielectric body 47, while the finer particles migrate through the open cells of the porous bodies 43 to the surface of one of the plate electrodes. The open cell structure causes the liquid to flow slowly over a devious path thereby keeping the liquid subject to the electric field for a much longer period of time than is otherwise possible.

In filtering hydrocarbon fuels and petroleum products in general, it has been found that the contaminates are generally of a gummy or sticky nature and as a consequence when they once are deposited upon one of the collecting electrodes 40 or 41 they tend to adhere to the surface of that electrode. However, should an agglomerated mass of such particles break loose or be eroded from the electrode for any reason and through the body 43 of porous dielectric, such re-suspended particles, being relatively large, are eliminated from the fluid stream by the third filter means consisting of the porous body 46 and the fine mesh screen 45.

After passing through the third filter element, the liquid stream flows longitudinally of the annular area inside the shell and around cylinder 50 to be exhausted from the shell through outlet opening 15.

Flow from the inside of the filter assembly outwardly to the periphery is preferred in the case of fluids having a relatively low density of particles to be removed and particularly when the particles are relatively fine. The action of the electrostatic field in removing the particles from suspension is then particularly marked because the particles are first charged in the central core and as the fluid stream moves away from the core the velocity of flow continually decreases as the fluid moves through a passage of increasing cross-section radially outward toward the shell wall, allowing a longer exposure to the electric field.

However, in the event that it is desired to filter a relatively dirty liquid, that is one in which the particles are largely 50 microns in diameter or more or the particle concentration is relatively high, it may be found advantageous to reverse the direction of flow. This is done by introducing the fluid stream through the opening 15 which then becomes the inlet. The flow is then from the outside of the filter assembly radially inward to the center in the reverse direction of that already described. The relatively large surface area around the periphery of filter elements 46 and 47 is thus used to best advantage because the relatively high concentration of suspended material is then distributed over a larger area so that the useful life of the filter between successive cleanings is extended. This also slows up clogging of the pores which eventually reduces the effectiveness of the filter. Under these circumstances, the third filter means, in direction of flow, becomes the filter element 20 and it serves as a final barrier to any relatively large particles which are not removed from suspension or have been eroded off the electrodes by the time the liquid stream reaches this filter element.

With the reverse direction of flow last described, the central charging field established between electrodes 21 and 27 becomes less effective because the fluid is largely cleaned by the time it reaches this field and because the velocity of flow may carry the particles out of the filter in suspension before they can be deposited on the cylindrical electrode. Under these circumstances, it may be found suitable to omit the discharge electrode 27. It is possible to establish a charging field between each pair of plate electrodes 40 and 41 by providing all such electrodes of one polarity with sharp points or edges to create surface configurations that concentrate the field locally into high-stress zones. This can be done easily by piercing the plates 40 with a sharp tool to form ragged projections 40p at one or preferably both sides of the plate as shown in FIG. 4. The result is a surface resembling the familiar kitchen grater. This electrode construction establishes a charging field between each pair of plate electrodes 40 and 41 while still subjecting the particles to the force of the field for a long enough time that the particles migrate to and are deposited on one of the electrodes. This electric filter is preceded by and followed by a mechanical or porous-element type of filter.

It has been found by experience when filtering hydrocarbons having a high resistivity that the suspended particles are often precharged electrically to a degree sufficient that they may be removed in an electrostatic field without the need of first being charged in an ionizing field. It is possible for particles to acquire an electric charge in many different ways since it is known that ionization occurs as a result of heat, friction, and other causes. If the fluid being filtered has come in contact with charged elements of an electric system, the suspended particles may have acquired a charge either by direct contact or by induction. The high dielectric nature of the liquid carrier prevents these particles from losing their charges. Consequently there are situations in which the suspended particles carry a sufficient electric charge at the time of entry into the filter that no discharging field is required in order to electrically charge the particles. Under these circumstances also, the discharge electrode 27 may be omitted. The presence of precharged particles is especially favorable to reverse flow through the filter, that is flow in the direction from the periphery inwardly to the core since in this design the charging field is located at the center.

The preferred embodiment illustrated herein is particularly designed for and adapted to filtration of liquids and has been so described. In a broad sense, the invention is independent of the specific fluid being passed through the unit; and it will be understood that a gaseous fluid may be filtered as well as a hydraulic fluid. It may be, and ordinarily will be, true that minor changes in design will be advisable to adapt the unit to a gaseous fluid because of the low viscosity of a gas compared with a liquid. At the same time the principles involved are not changed.

From the foregoing description it will be evident that various changes in the detailed design, construction, and arrangement of the component parts of my improved filter may be made by persons skilled in the art without departing from the spirit and scope of my invention. Accordingly, it is to be understood that the above description is considered to be illustrative of, rather than limitative upon, the invention as defined by the appended claims.

I claim:

1. A filter for removing suspended particles from a stream of fluid, comprising in combination:
   a hollow shell having spaced inlet and outlet openings for the fluid stream;
   filter means inside the shell comprising a pair of parallel electrodes spaced apart to permit fluid flow between them and
   a body of porous dielectric material filling the space between the electrodes and through which the fluid flows;
   means for establishing an electric potential between said pair of electrodes to maintain an electro-static field between the pair of electrodes;
   means for introducing fluid to the filter means near one edge of the electrodes, the fluid flowing away from said edge and toward a remote edge of the electrodes through the body of porous dielectric material through a passage between the electrodes, said passage being of progressively increasing cross-sectional area in the direction of fluid flow.

2. A filter for removing suspended particles from a stream of fluid, comprising in combination:
   a hollow shell having spaced inlet and outlet openings for the fluid stream;
   filter means inside the shell comprising a plurality of pairs of parallel electrodes spaced apart to permit fluid flow between them and
   porous dielectric material filling the spaces between successive electrodes and through which the fluid flows;
   means for establishing an electric potential between successive electrodes to maintain an electro-static field between each successive pair of electrodes;
   means extending transversely of the electrodes introducing fluid to the filter means near one edge of all the electrodes, the fluid flowing away from said one edge toward a remote edge of the electrodes through the porous dielectric material through a passage of progressively increasing cross-sectional area in the direction of fluid flow.

3. A filter as in claim 2 which also includes a second filter means inside the shell and located downstream from the first-mentioned filter means, said second filter means comprising a porous-element type of filter adapted to retain agglomerates of deposited particles eroded by the fluid stream.

4. A filter as in claim 3 in which the porous dielectric material is open-cell polyurethane foam in contact with the electrodes.

5. In a filter for removing suspended particles from a stream of fluid, the combination comprising:
   a hollow shell having spaced inlet and outlet openings for the fluid stream;
   a first filter means inside the shell comprising a porous-element type filter through which the fluid stream first passes, said filter being a hollow cylindrical member open at one end and in communication with said inlet opening to receive said fluid stream and closed at the other end;
   a second filter means inside the shell and located downstream from the first filter means, said second filter means including a pair of parallel plate-like electrodes spaced apart to permit fluid flow between and generally parallel to them;
   a body of porous dielectric material filling the space between the electrodes and through which the fluid flows;
   and means for establishing an electric potential between said pair of electrodes to maintain an electrostatic field between the pair of electrodes.

6. In a filter for removing suspended particles from a stream of fluid the combination as in claim 5 that also includes a third filter means of the porous-element type downstream from the second filter means.

7. In a filter for removing suspended particles from a stream of fluid, the combination as in claim 5 which also includes an elongated electrode having surface portions of relatively small radius extending axially of and within the cylindrical filter member, said cylindrical member being a porous element, and a foraminous metal electrode opposing said discharge electrode and disposed outwardly of and about the cylindrical filter member.

8. In a filter for removing suspended particles from a stream of fluid, the combination as in claim 5 in which the second filter means comprises a plurality of axially spaced, radially extending plates surrounding the cylindrical member and extending radially outwardly therefrom, alternate plates being electrically connected and successive plates electrically insulated from each other whereby an electrostatic field is maintained between each pair of successive plates.

9. In a filter for removing suspended particles from a stream of fluid, the combination comprising:
a hollow shell of generally cylindrical configuration having spaced inlet and outlet openings near opposite ends thereof for the fluid stream;
a first filter means inside the shell comprising a hollow cylindrical, porous-element type filter co-axial with the shell through which the fluid stream first passes, said first filter means being open at one end communicating with said inlet opening to receive said fluid stream and closed at the other end;
a second filter means inside the shell and located downstream from the first filter means, said second filter means surrounding the first filter means and including a pair of parallel plate type electrodes spaced apart to permit fluid flow between and generally parallel to them;
a body of porous dielectric material filling the space between said pair of parallel electrodes and through which the fluid flows;
and means for establishing an electric potential between said pair of electrodes to maintain an electrostatic field between the pair of electrodes.

10. In a filter for removing suspending particles from a stream of fluid, the combination comprising:
a shell having fluid inlet and outlet openings;
a first pair of spaced electrodes inside the shell of which one is an electrode having surface portions of relatively small radius adapted to establish an electrostatic charging field between them;
a second pair of spaced parallel electrodes inside the shell adapted to establish a collecting field between them;
a body of porous dielectric material filling the space between said second pair of electrodes and through which the fluid flows;
electrical means to establish an electrical potential between the electrodes of each pair to maintain said fields;
and a porous-element filter of dielectric material substantially at the entrance to the collecting field.

11. In a filter for removing suspended particles from a stream of fluid, the combination as in claim 10 in which the first pair of electrodes comprises a wire and a coaxial, foraminous metal cylinder surrounding the wire, and the porous-element filter is inside the metal cylinder.

12. In a filter for removing suspended particles from a stream of fluid, the combination as in claim 10 which also includes a porous diffusion member substantially at the fluid exit from between the second electrodes and through which fluid flows after leaving the collecting field.

13. In a filter for removing suspended particles from a stream of fluid, the combination as in claim 12 which also includes a second porous-element filter adjacent and downstream from the diffusion member, said second filter element having pores of the order of 50 microns or less in diameter.

14. In a filter for removing suspended particles from a stream of fluid, the combination comprising:
a hollow shell having spaced inlet and outlet openings for the fluid stream;
a first pair of electrodes of which one is an electrode having surface portions of relatively small radius to charge suspended particles as the fluid stream flows past the electrodes;
a first filter means inside the shell comprising a porous-element type filter through which the fluid stream passes;
a second filter means inside the shell and located downstream from the first filter means, said second filter means including a pair of parallel extended area electrodes spaced apart to permit liquid flow between them;
a body of porous dielectric material filling the space between said second pair of electrodes and through which the fluid flows;
and means for establishing an electric potential between said first pair of electrodes and also the pair of extended area electrodes to maintain an electrostatic field between the electrodes of each pair.

15. In a filter for removing suspended particles from a stream of liquid the combination as in claim 14 that also includes a third filter means of the porous-element type downstream from the second filter means.

16. In a filter for removing suspended particles from a stream of fluid, the combination comprising:
a hollow shell having spaced inlet and outlet openings for the fluid stream;
a first filter means inside the shell comprising a porous-element type filter through which the fluid stream first passes;
a pair of parallel plate-like electrodes located downstream from said filter means and spaced apart to permit liquid flow between them, one electrode of the pair having surface portions of relatively small radius;
and means for establishing an electric potential between said pair of plate-like electrodes to maintain an electro-static field between the pair of electrodes.

17. In a filter for removing suspended particles from a stream of fluid, the combination comprising:
a hollow shell having spaced inlet and outlet openings for the fluid stream;
a hollow cylindrical filter element located co-axially of the shell and open at one end to communicate with one of the fluid openings in the shell;
a pair of electrodes including an electrode having surface portions of relatively small radius located centrally of the cylindrical filter element to charge suspended particles in the fluid stream;
means directing fluid flow radially through the filter element between the filter element and an annular space within the shell in communication with the other fluid opening in the shell;
and means for maintaining an electro-static field between the pair of electrodes.

18. In a filter for removing suspended particles from a fluid stream the combination as in claim 17 in which the hollow cylindrical element is electrically conductive and is one of the pair of electrodes.

19. In a filter for removing suspended particles from a fluid stream the combination as in claim 17 which also includes a porous-element filter surrounding the pair of electrodes through which the fluid passes in series with the cylindrical element.

20. A filter for removing suspended particles from a stream of fluid, comprising in combination:
a hollow shell having spaced inlet and outlet openings for the fluid stream;
a filter means inside the shell comprising a plurality of spaced, parallel, plate-like electrodes spaced apart to permit fluid flow between successive plates;
a body of porous dielectric material filling the space between each pair of parallel electrodes and through which the fluid flows;
means for establishing an electric potential between successive parallel electrodes to maintain an electrostatic field between each pair of parallel electrodes;
means defining an axially extending fluid passsage communicating with the inlet opening and located centrally of the filter means from which the fluid flows radially outwardly through the bodies of dielectric material between successive parallel electrodes;

and means defining a fluid passage surrounding the periphery of the filter means and communicating with the outlet opening;

References Cited by the Examiner

UNITED STATES PATENTS

| | | | |
|---|---|---|---|
| 799,605 | 9/1905 | Lester | 204—302 |
| 1,162,213 | 11/1915 | Bloom | 204—186 |
| 1,838,927 | 12/1931 | Fischer | 204—189 |
| 1,931,725 | 10/1933 | Girrin | 204—299 |
| 2,299,964 | 10/1942 | Crouch | 204—186 |
| 2,364,118 | 12/1944 | Wolfe | 204—302 |
| 2,450,016 | 9/1948 | Pinkel | 204—302 |
| 2,534,907 | 12/1950 | Ham et al. | 204—188 |
| 2,573,967 | 11/1951 | Hamlin | 204—188 |
| 2,900,320 | 8/1959 | Metcalfe | 204—300 |
| 2,925,372 | 2/1960 | Keehn | 204—302 |
| 2,960,454 | 11/1960 | Warner et al. | 204—186 |
| 3,162,592 | 12/1964 | Pohl | 204—186 |
| 3,190,827 | 6/1965 | Kok et al. | 204—302 |

FOREIGN PATENTS

| | | |
|---|---|---|
| 353,522 | 8/1905 | France. |
| 721,509 | 1/1955 | Great Britain. |

JOHN H. MACK, *Primary Examiner.*

MURRAY A. TILLMAN, *Examiner.*